(12) United States Patent
Nanu et al.

(10) Patent No.: US 9,137,425 B2
(45) Date of Patent: Sep. 15, 2015

(54) METHODS AND APPARATUSES FOR USING IMAGE ACQUISITION DATA TO DETECT AND CORRECT IMAGE DEFECTS

(71) Applicant: DigitalOptics Corporation Europe Limited, Galway (IE)

(72) Inventors: Florin Nanu, Bucuresti (RO); Peter Corcoran, Claregalway (IE); Cosmin Nicolae Stan, Bucuresti (RO)

(73) Assignee: FotoNation Limited, Ballybrit, Galway (IE)

( * ) Notice: Subject to any disclaimer, the term of this patent is extended or adjusted under 35 U.S.C. 154(b) by 122 days.

(21) Appl. No.: 13/802,672

(22) Filed: Mar. 13, 2013

(65) Prior Publication Data

US 2013/0194462 A1 Aug. 1, 2013

Related U.S. Application Data

(62) Division of application No. 13/306,972, filed on Nov. 29, 2011, now Pat. No. 8,525,898, which is a division of application No. 12/362,399, filed on Jan. 29, 2009, now Pat. No. 8,212,864.

(60) Provisional application No. 61/024,551, filed on Jan. 30, 2008.

(30) Foreign Application Priority Data

Jan. 30, 2009 (EP) .................. PCT/EP2009/051081

(51) Int. Cl.
*H04N 5/228* (2006.01)
*H04N 5/217* (2011.01)
(Continued)

(52) U.S. Cl.
CPC .............. *H04N 5/217* (2013.01); *G06T 5/007* (2013.01); *G06T 7/0002* (2013.01);
(Continued)

(58) Field of Classification Search
CPC .............. H04N 5/23229; H04N 1/624; H04N 5/23219; H04N 5/2354
USPC ............................................ 348/220.1, 222.1
See application file for complete search history.

(56) References Cited

U.S. PATENT DOCUMENTS 4,285,588 A 8/1981 Mir
4,978,989 A * 12/1990 Nakano et al. .................. 396/88

(Continued)

FOREIGN PATENT DOCUMENTS

EP 1296510 A2 3/2003
EP 1785914 A1 5/2007

(Continued)

OTHER PUBLICATIONS

Non-Final Rejection, dated Apr. 22, 2013, for U.S. Appl. No. 13/306,972, filed Nov. 29, 2011.

(Continued)

*Primary Examiner* — Ahmed A Berhan
(74) *Attorney, Agent, or Firm* — Hickman Palermo Becker Bingham LLP

(57) ABSTRACT

A method and device for detecting a potential defect in an image comprises acquiring a digital image at a time; storing image acquisition data, wherein the image acquisition data includes at least one of a position of a source of light relative to a lens, a distance from the source of light to the lens, a focal length of the lens, a distance from a point on a digital image acquisition device to a subject, an amount of ambient light, or flash intensity; determining dynamic anthropometric data, wherein the dynamic anthropometric data includes one or more dynamically changing human body measurements, of one or more humans represented in the image, captured at the time; and determining a course of corrective action based, at least in part, on the image acquisition data and the dynamic anthropometric data.

12 Claims, 10 Drawing Sheets
(4 of 10 Drawing Sheet(s) Filed in Color)

(51) Int. Cl.
*G06T 7/00* (2006.01)
*G06T 7/40* (2006.01)
*H04N 1/62* (2006.01)
*G06T 5/00* (2006.01)

(52) U.S. Cl.
CPC .............. *G06T 7/0042* (2013.01); *G06T 7/408* (2013.01); *H04N 1/62* (2013.01); *H04N 1/624* (2013.01); *G06T 2207/30216* (2013.01)

(56) References Cited

U.S. PATENT DOCUMENTS

| | | | |
|---|---|---|---|
| 5,231,674 | A | 7/1993 | Cleveland et al. |
| 5,400,113 | A * | 3/1995 | Sosa et al. .................... 396/158 |
| 5,426,478 | A | 6/1995 | Katagiri et al. |
| 5,649,238 | A | 7/1997 | Wakabayashi et al. |
| 5,950,023 | A | 9/1999 | Hara et al. |
| 6,047,138 | A | 4/2000 | Teremy |
| 6,285,410 | B1 | 9/2001 | Marni |
| 6,407,777 | B1 | 6/2002 | DeLuca |
| 6,980,691 | B2 | 12/2005 | Nesterov et al. |
| 7,042,501 | B1 | 5/2006 | Matama |
| 7,133,070 | B2 | 11/2006 | Wheeler et al. |
| 7,155,058 | B2 | 12/2006 | Gaubatz et al. |
| 7,304,677 | B2 | 12/2007 | Keelan et al. |
| 7,352,394 | B1 | 4/2008 | DeLuca et al. |
| 7,508,444 | B1 | 3/2009 | Napoli et al. |
| 7,567,707 | B2 | 7/2009 | Willamowski et al. |
| 7,652,695 | B2 | 1/2010 | Halpern |
| 7,684,642 | B2 | 3/2010 | Gallagher et al. |
| 7,705,891 | B2 | 4/2010 | Silverbrook |
| 7,747,160 | B2 | 6/2010 | Thorn |
| 7,835,572 | B2 * | 11/2010 | Ferman .................... 382/167 |
| 7,907,786 | B2 | 3/2011 | Fan et al. |
| 8,212,864 | B2 | 7/2012 | Nanu et al. |
| 8,836,777 | B2 | 9/2014 | Mehra |
| 2002/0136450 | A1 | 9/2002 | Chen et al. |
| 2003/0025811 | A1 | 2/2003 | Keelan et al. |
| 2003/0095197 | A1 | 5/2003 | Wheeler et al. |
| 2003/0161506 | A1 | 8/2003 | Velazquez et al. |
| 2003/0202105 | A1 | 10/2003 | Gaubatz et al. |
| 2003/0231241 | A1 | 12/2003 | Lida |
| 2004/0119851 | A1 | 6/2004 | Kaku |
| 2004/0196433 | A1 | 10/2004 | Durnell |
| 2005/0058340 | A1 | 3/2005 | Chen et al. |
| 2005/0200736 | A1 | 9/2005 | Ito |
| 2006/0257132 | A1 | 11/2006 | Shiffer et al. |
| 2007/0053614 | A1 | 3/2007 | Mori et al. |
| 2008/0165265 | A1 | 7/2008 | Chiba et al. |
| 2008/0211936 | A1* | 9/2008 | Ichimasa .................... 348/241 |
| 2009/0103784 | A1 | 4/2009 | Forutanpour |
| 2010/0226639 | A1 | 9/2010 | Thorn |
| 2011/0254981 | A1 | 10/2011 | Ito |

FOREIGN PATENT DOCUMENTS

| | | |
|---|---|---|
| JP | 5-224271 A | 9/1993 |
| JP | 11-175699 A | 7/1999 |
| JP | 11-284874 A | 10/1999 |
| JP | 2000-125320 A | 4/2000 |
| JP | 2006285944 A | 10/2006 |
| WO | 2005/015896 A1 | 2/2005 |

OTHER PUBLICATIONS

Japanese publication No. 05-224271 (using PTO translation No. 2009-5746), Feb. 13, 1992.
Notice of Allowance, dated Jun. 25, 2013, for U.S. Appl. No. 13/306,972, filed Nov. 29, 2011.
PCT Notification of Transmittal of the International Search Report and the Written Opinion of the International Searching Authority, or the Declaration, for PCT Application No. PCT/EP2009/051081, dated Apr. 16, 2009, 6 pages.
PCT International Preliminary Report on Patentability, Chapter I, for PCT Application No. PCT/EP2004/008706, dated Feb. 6, 2006, 7 Pages.
Patent Abstracts of Japan, publication No. JP05-224271, Sep. 3, 1993, for Image Processor.
Patent Abstracts of Japan, publication No. JP2003109008A, publication date: Apr. 11, 2003, Method for Automatic Detection of Red-Eye Defect in Photographic Image Data.
Patent Abstracts of Japan, publication No. JP2064532A, publication date: Mar. 5, 1990, Photographing Information Recordable Camera, and Information Outputting Device for Visualizing Object Information.
Patent Abstracts of Japan, publication No. JP11175699A, publication date: Jul. 2, 1999, Picture Processor.
Patent Abstracts of Japan, publication No. JP2003209683A, publication date: Jul. 25, 2003, Image Processing Equipment and Image Processing Method.
Patent Abstracts of Japan, publication No. JP2003163861A, publication date: Jun. 6, 2006, System and Method for Deciding When to Correct Image-Specific Defects Based on Camera, Scene, Display and Demographic Data.
Patent Abstracts of Japan, publication No. JP2003283849A, publication date: Oct. 3, 2003, Method for Detecting and Correcting Red Eye.
Patent Abstracts of Japan, publication No. JP5019382A, publication date: Jan. 29, 2003, Photographic Print Red-Eye Effect Correcting Method and Pictorial Hard Copying Device.
Non-Final Rejection, dated Dec. 14, 2011, for U.S. Appl. No. 12/362,399, filed Jan. 29, 2009.
PCT Written Opinion of the International Search Authority, for PCT Application No. PCT/EP20041008706, dated Feb. 6, 2006, 6 Pages.
Patent Abstracts of Japan, for Japanese Patent Application Laid-Open No. 2002-247596. Date of publication of application: Aug. 30, 2002. Application No. 2001-044807. Program for Specifying Red Eye Area in Image, Image Processor and Recording Medium.
Patent Abstract of Japan, for Japanese Patent Application Laid-Open No. 2000-125320. Date of publication of application: Apr. 28, 2000. For: Computer Program Product for Detecting Pink Eyes.
Patent Abstracts of Japan, for Japanese Patent Application Laid-Open No. 2004-242141. Date of publication of application: Aug. 24, 2004, Application number: 2003-030541. For: Color Defective Area Correction Method, Color Defective Area Correction Processing Program, and Image Processing Apparatus.
Patent Abstracts of Japan, for Japanese Patent Application Laid-Open No. 2005-196385. Date of publication of application: Jul. 21, 2005, Application number: 2004-001007. For: Image Processing Apparatus, Image Processing Method and Digital Camera.

* cited by examiner

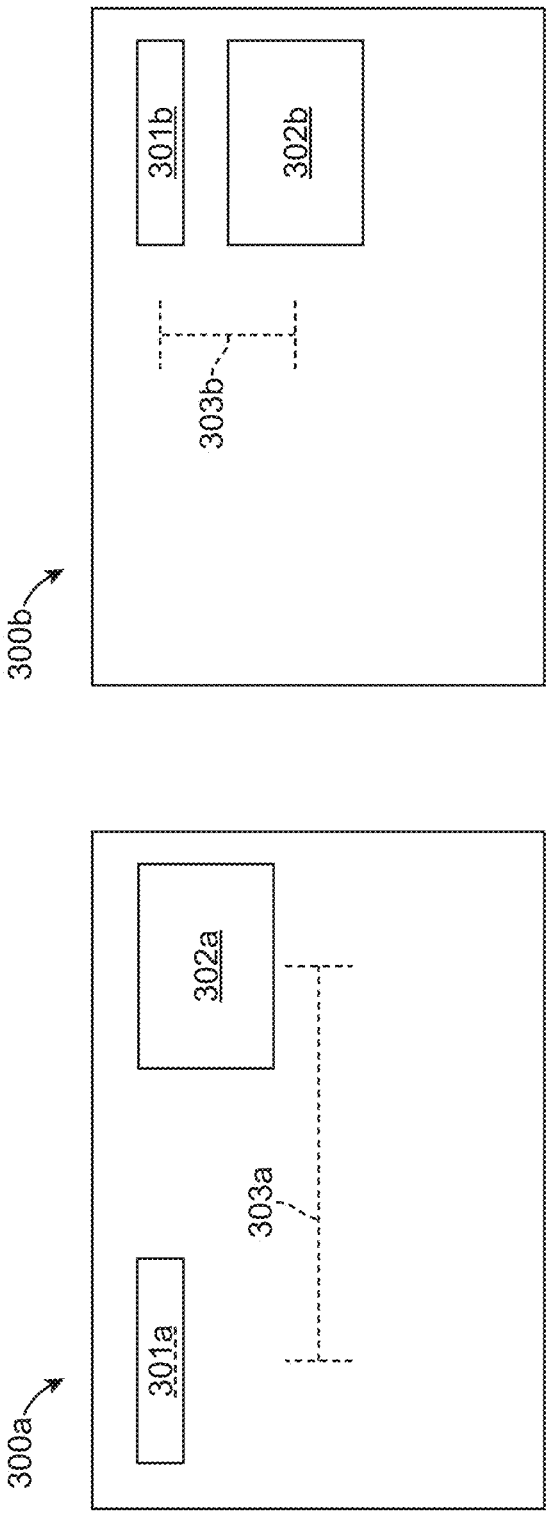

METHODS AND APPARATUSES FOR USING IMAGE ACQUISITION DATA TO DETECT AND CORRECT IMAGE DEFECTS

PRIORITY CLAIMS AND RELATED APPLICATIONS

This application is a Division of U.S. patent application Ser. No. 13/306,972, filed Nov. 29, 2011; which is a Division of U.S. patent application Ser. No. 12/362,399, filed Jan. 29, 2009, now U.S. Pat. No. 8,212,864; which claims domestic priority from prior U.S. provisional patent application Ser. No. 61/024,551, filed on Jan. 30, 2008, titled "METHODS AND APPARATUSES FOR EYE GAZE MEASUREMENT," the entire disclosure of which is hereby incorporated by reference for all purposes as if fully set forth herein.

FIELD OF THE INVENTION

The present disclosure relates generally to digital image processing and more particularly to error correction in digital photographs.

BACKGROUND OF THE INVENTION

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

The flashes on many portable cameras can cause undesirable defects in captured images. One of the most common defects is a "Red-eye" phenomenon where a flash is reflected within a subject's eye and appears in a photograph as a red dot where the black pupil of the subject's eye would normally appear. The unnatural glowing red of an eye is due to internal reflections from the vascular membrane behind the retina, which is rich in blood vessels. This undesired defect is well understood to be caused in part by a small angle between the flash of the camera and the lens of the camera. Due to the miniaturization of cameras with integral flash capabilities, the phenomenon can be quite pronounced in many of today's smaller, portable cameras.

The red-eye defect can be minimized by causing the iris to reduce the opening of the pupil, such as with a "pre-flash," which involves a flash or illumination of light shortly before a flash photograph is taken causing the iris to close. Unfortunately, the pre-flash occurs 0.2 to 0.6 seconds prior to the flash photograph, which is a readily discernible time period within the reaction time of a human subject. Consequently, the subject may believe the pre-flash is the actual photograph and be in a less than desirable position at the time of the actual photograph, or the subject might be informed of the photograph by the pre-flash, typically loosing any spontaneity of the subject that could be captured in the photograph. Therefore, the use of a pre-flash, while somewhat helpful in reducing the red-eye phenomenon, can negatively affect images in other ways.

With the advent of digital cameras and digital image software on computers, techniques for eliminating flash-induced eye defects by processing a captured image with microprocessor-based devices, either external to a camera or built into a camera, have become common place. Most of the algorithms executed by the microprocessor-based devices are quite rudimentary. For example, a common defect removal algorithm involves looking at a digital image for pixels within a color spectrum that form a shape within a range of shapes to identify defect candidates. Techniques exist for narrowing the color spectrum and narrowing the shape range that algorithms use to identify potential defects candidates, but those existing techniques are very limited, and in many cases, are as likely to cause a true-positive to be missed as they are to cause a false-positive to be avoided because such techniques do not account for the physiological variations in human eyes or the conditions under which the image was captured. Therefore, there exists in the art a need for improved flash-induced eye defect detection and correction algorithms.

BRIEF DESCRIPTION OF THE DRAWINGS

Statement Regarding Color Drawings

The patent or application file contains at least one drawing executed in color. Copies of this patent or patent application publication with color drawing(s) will be provided by the Office upon request and payment of the necessary fee.

The present invention is illustrated by way of example, and not by way of limitation, in the figures of the accompanying drawings.

FIGS. 1a-d show examples of common flash-induced eye defects that can occur in captured digital images.

Figure 2:
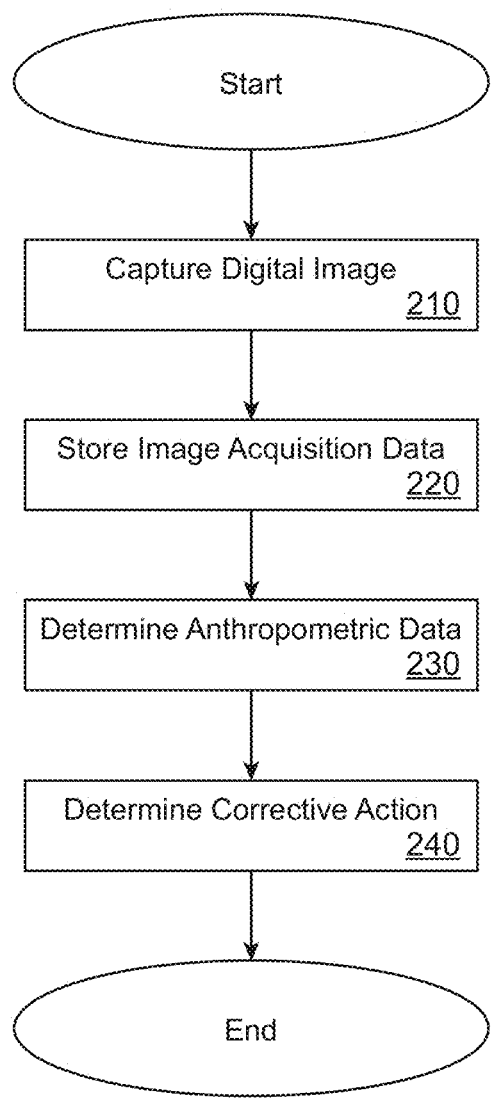

FIG. 2 shows a flow chart illustrating a method embodying aspects of the present invention.

FIGS. 3a and 3b illustrate two possible configurations for portable digital image acquisition devices.

Figure 4A:
Figure 4B:
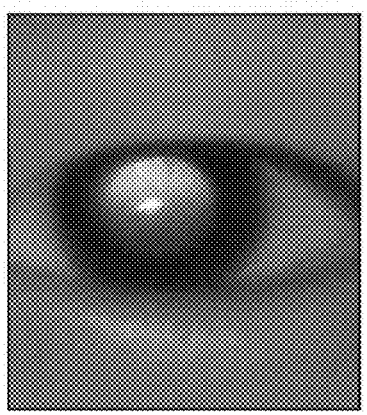

FIGS. 4a-b show variations of half-red eye defects.

Figure 5:
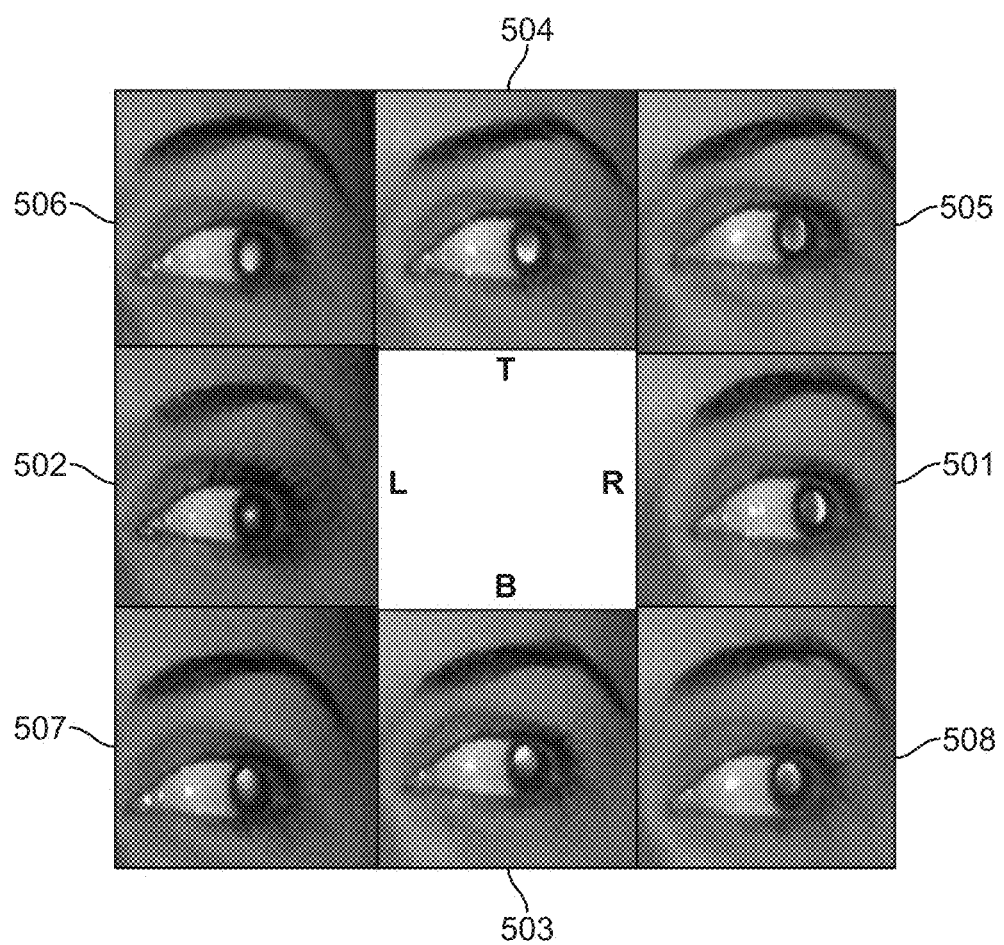

FIG. 5 shows the various half-red eye phenomenon that occur when a flash is to the right of a lens, to the left of a lens, to the bottom of a lens, to the top of the lens, to the top right of the lens, to the top left of the lens, to the bottom left of the lens, or to the bottom right of the lens.

Figures 6A, 6B:
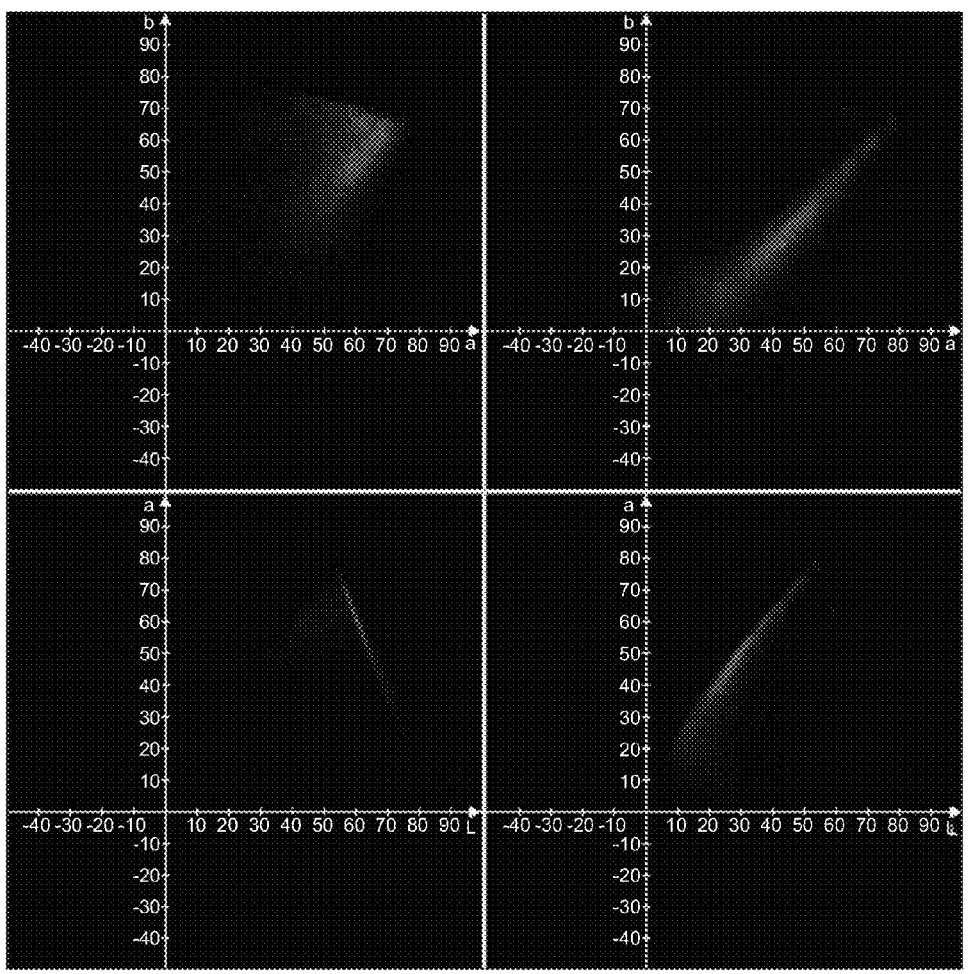

FIGS. 6a-b show common color spectrums for red-eye defects for flash-to-lens distances of 2 cm and 5 cm.

Figure 7:
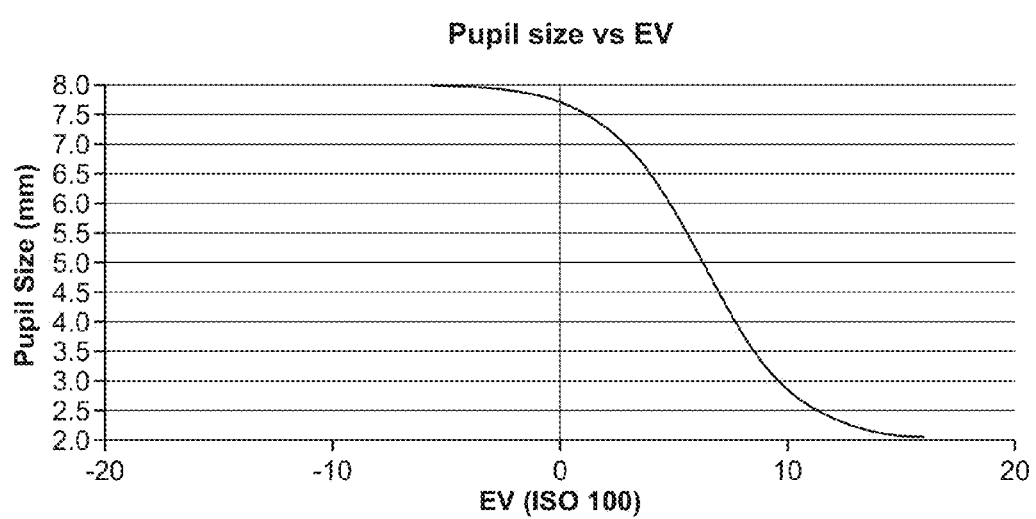

FIG. 7 shows a plot of pupil size as a function of ambient lighting.

Figures 8A, 8B, 8C:
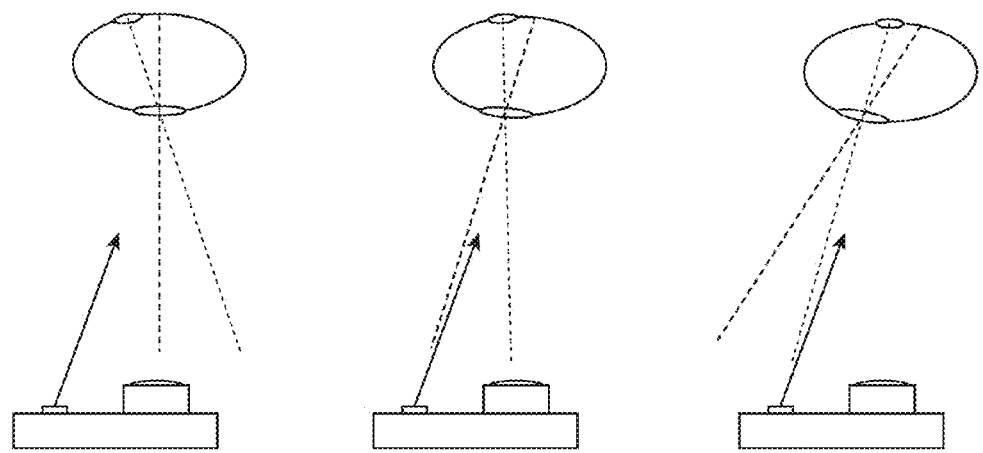

FIGS. 8a-c show eyes with various degrees of eye gaze.

Figure 9:
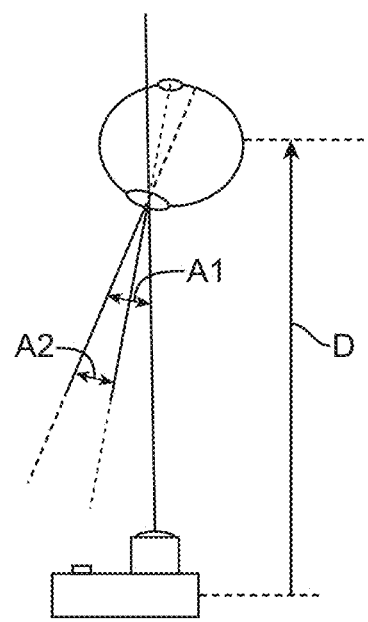

FIG. 9 shows the eye gaze angles for an eye pair.

Figure 10:
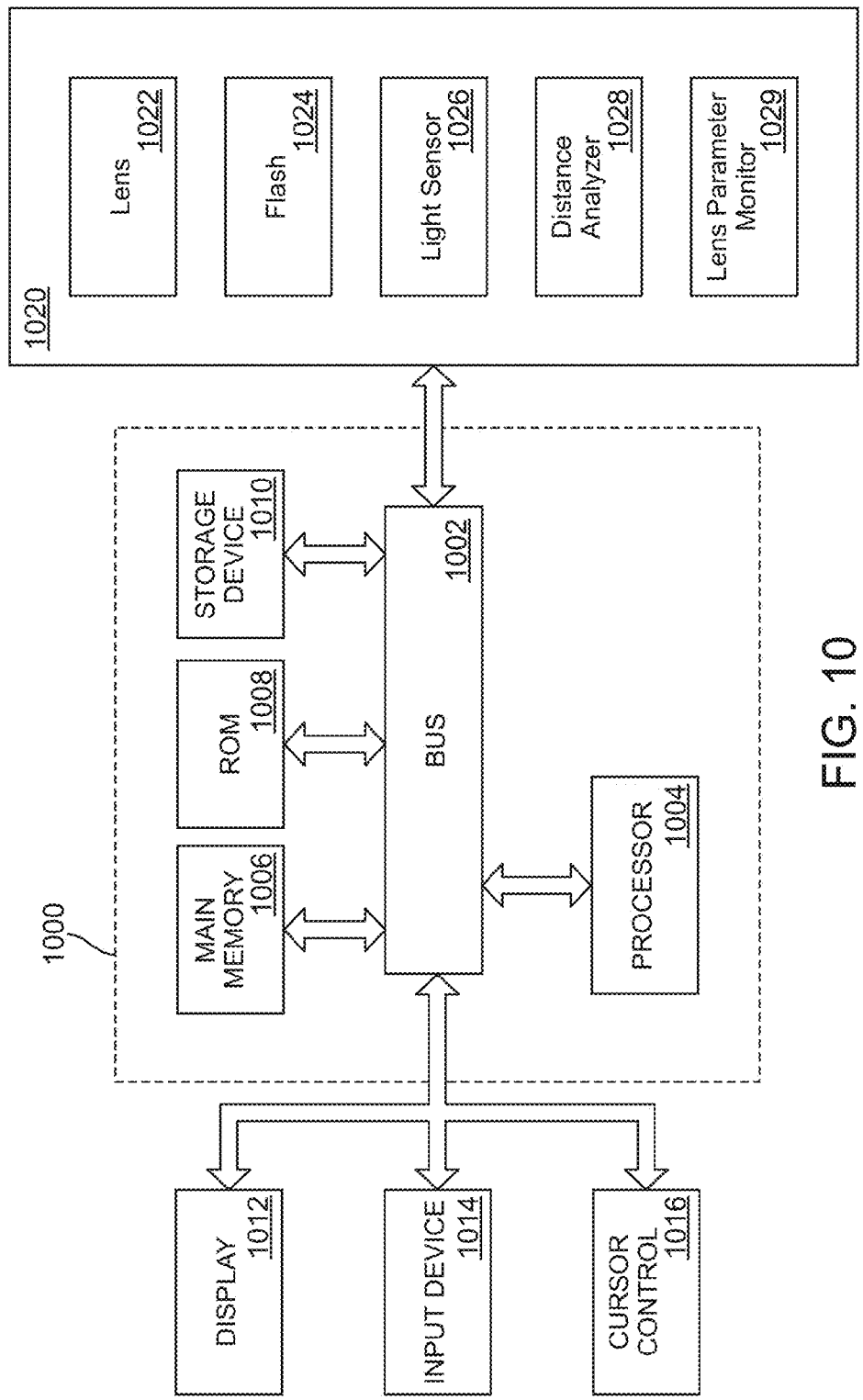

FIG. 10 is a block diagram of a portable image acquisition device.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Figure 1A:
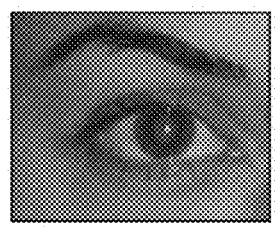
Figure 1B:
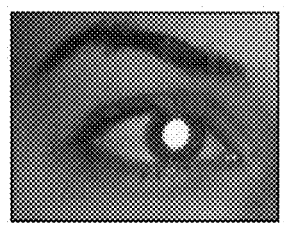
Figure 1C:
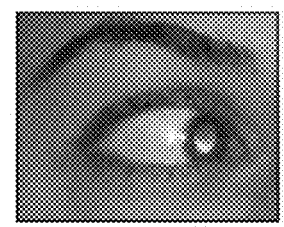
Figure 1D:

FIGS. 1a-d show examples of common flash-induced eye defects that can occur in captured digital images. FIG. 1a shows a digital image where an eye is displaying the red-eye phenomenon. FIG. 1b shows a digital image where an eye is displaying golden-eye phenomenon. FIG. 1c shows a digital image where an eye is displaying a half-red eye phenomenon. FIG. 1d shows a digital image where one eye is displaying a red-eye phenomenon, and the other eye is displaying a golden-eye phenomenon. Aspects of the present invention relate to improving algorithms for removing these defects from captured digital images.

U.S. Pat. No. 7,352,394, filed on Feb. 4, 2004, titled "IMAGE MODIFICATION BASED ON RED-EYE FILTER ANALYSIS," discusses techniques for removing defects like those shown in FIGS. 1a-d from digital images. The entire disclosure of U.S. Pat. No. 7,352,394 is hereby incorporated by reference for all purposes as if fully set forth herein.

Techniques of the present invention include storing image acquisition data when an image is captured or acquired and using the image acquisition data in determining how to correct potential defects like the ones illustrated in FIGS. 1a-d. Examples of image acquisition data can include the position of the flash relative to the lens, the distance from the flash to the lens, a focal length of the lens, the distance from a point on the image acquisition device to a subject being photographed, an amount of ambient light, and flash intensity. The image acquisition data can be used in determining a course of action for how to process the image after capture. For example, image acquisition data corresponding to a certain acquisition condition, such as large ambient light for example, might determine which subset of algorithms from a plurality of defect correction algorithms to apply to a certain image or might determine parameters to be used by a certain defect correction algorithm.

Further techniques of the present invention can include using image acquisition data to determine dynamic anthropometric data to determine which subset of algorithms from a plurality of defect correction algorithms to apply to a certain image or to determine parameters to be used by a certain defect correction algorithm. Further techniques of the present invention can also include using image acquisition data in conjunction with dynamic anthropometric data to determine which subset of algorithms from a plurality of defect correction algorithms to apply to a certain image or to determine parameters to be used by a certain defect correction algorithm.

FIG. 2 shows a flow chart illustrating a method embodying aspects of the present invention. The method comprises capturing a digital image (block 210) with a portable digital image acquisition device such as a camera or smartphone. The method further comprises storing image acquisition data associated with the captured digital image (block 220) and determining dynamic anthropometric data associated with the captured image (block 230). The dynamic anthropometric data can be derived from the image acquisition data, determined from the content of the acquired digital image, or determined in any other manner known in the art. Based on the image acquisition data and dynamic anthropometric data, whether and how to perform corrective action on the digital image can be determined (block 240).

One potential embodiment of the present invention can include one or more processor-readable media having embedded code therein for programming a processor to perform a method including the steps of acquiring a digital image at a time, storing image acquisition data describing a condition at the time, determining an eye gaze angle in the digital image, and determining a course of corrective action based, at least in part, on the image acquisition data and the eye gaze angle.

Another potential embodiment of the present invention can include one or more processor-readable media having embedded code therein for programming a processor to perform a method including the steps of detecting a value indicative of ambient light at a time when the image is acquired, storing the value in association with the image, and determining whether a course of action based, at least in part, on the value.

Another potential embodiment of the present invention can include one or more processor-readable media having embedded code therein for programming a processor to perform a method including the steps of storing a value indicative of a position of a source of light relative to a lens, using the value to identify an expected orientation for a half-red eye defect, and identifying defect candidates in the image at least in part based on the expected orientation.

Another potential embodiment of the present invention can include one or more processor-readable media having embedded code therein for programming a processor to perform a method including the steps of acquiring a digital image at a time; storing image acquisition data, wherein the image acquisition data includes at least one of a position of a source of light relative to a lens, a distance from a source of light to the lens, a focal length of the lens, a distance from a point on a digital image acquisition device to a subject, an amount of ambient light, or flash intensity; determining dynamic anthropometric data, wherein the dynamic anthropometric data includes one or more dynamically changing human body measurements, of one or more humans represented in said image, captured at said time; and, determining a course of corrective action based, at least in part, on the image acquisition data and the dynamic anthropometric data.

Other potential embodiments of the present invention include a portable digital image acquisition device comprising a lens, a digital imaging capturing apparatus, a source of light for providing illumination during image capture, and logic for performing operations stored on processor-readable media having embedded code therein for programming a processor to perform a method.

Image Acquisition Data

Techniques of the present invention include storing, such as in a memory on a portable digital acquisition device, various types of image acquisition data associated with a captured digital image. The image acquisition data can be stored, for example, as metadata associated with an image file. Examples of image acquisition data include but are not necessarily limited to the position of the flash relative to the lens, the distance of the flash from the lens, a focal length of the lens, the distance to a subject being photographed, amount of ambient light, and flash intensity.

One type of image acquisition data that can be stored is the position of a flash relative to the lens that captures a digital image. FIGS. 3a and 3b illustrate two possible configurations for portable digital image acquisition devices 300a-b. In the portable digital image acquisition device 300a of FIG. 3a, the flash 301a is positioned to the side of the lens 302a whereas in the portable digital image acquisition device 300b of FIG. 3b, the flash 301b is positioned directly above the lens 302b. When the portable digital acquisition devices of FIGS. 300a-b are rotated 90 degrees, when taking a profile picture for example, the flash 301a in FIG. 3a will be below the lens 302, and the flash 301b in FIG. 3b will be to the side of the lens 302b. As will be discussed in more detail later, knowing the relative position of the lens to the flash can help identify particular types of eye defect phenomenon. For example, a flash positioned to the side of the lens is more likely to produce a half-red eye phenomenon like the one of FIG. 4a, whereas a flash positioned above the lens is more likely to produce a half-red eye phenomenon like the one shown in FIG. 4b.

Another type of image acquisition data that can be stored is the distance between the lens and the flash. For example, in FIG. 3a, the distance between the lens 302a and flash 301a is shown by dotted line 303a, and in FIG. 3b, the distance between the lens 302b and flash 301b is shown by dotted line 303b. Depending on the configuration of the particular device executing the various defect correction algorithms, the distance between the flash and lens may be constant, in which case the distance can be stored by a device designer without needing to be dynamically calculated with every image acquisition. In other portable digital acquisition devices that have movable lenses or flashes or connection mechanisms for external lenses or flashes, then the distance may be dynamically calculated with every image acquisition.

Another type of image acquisition data that can be stored is ambient lighting as measured by the portable digital image acquisition device at the time a photo is taken. The measurement can be performed by a light sensor such as a charge-coupled device (CCD) sensor or complimentary metal-oxide semiconductor (CMOS) sensor that can transform light information into electronic coding, such as a value indicative of a light value or an exposure value.

Another type of image acquisition data that can be stored is the focal length of a lens. Most digital image acquisition devices have lenses with variable focal lengths. Techniques of the present invention include storing a value indicative of focal length to be used in post-capture image analysis. Another type of image acquisition data that can be stored is the distance between a point on portable digital acquisition device, such as a lens, and a subject being photographed. Most digital image acquisition devices include distance analyzers for use with automatic focusing mechanisms. Techniques of the present invention include storing a value indicative of the distance between a point on the device and a subject to be used in post-capture image analysis.

Using Image Acquisition Data to Determine which Defect Phenomenon to Look For

Techniques of the present invention include using image acquisition data to aid in determining what defect phenomenon to look for. Acquisition data indicating the position of a flash relative to the lens, for example, can be used to determine the orientation of certain defects. For example, if a flash is located above a lens then the yellowish part of a half-red eye will be the lower part of the eye, and vice versa. If a flash is located to the left of a lens, then the yellowish part of the half-red eye will be the right part of the eye, and vice versa. FIG. 5 shows the various half-red eye phenomenon that occur when a flash is to the right of a lens (501), to the left of a lens (502), to the bottom of a lens (503), to the top or the lens (504), to the top right of the lens (505), to the top left of the lens (506), to the bottom left of the lens (507), or to the bottom right of the lens (508).

This information can be used to determine the expected red-yellow gradient of a half-red eye, which can be used to reduce the detection of false positives. Algorithms exist that detect half-red eyes by detecting yellow/red color groupings of pixels that form a certain shape, and thus are indicative of a half-red eye. The red-yellow gradient of a grouping indicative of a half-red eye can be compared to the expected red-yellow gradient to identify false positives. For example, if detected groupings have left-to-right or top-to-bottom red-yellow gradients but the expected red-yellow gradient is right-to-left, then the groups with non-right-to-left gradients can be identified as non-half-red eyes, and thus not be altered. The detected groupings that do have a right-to-left red-yellow gradient can undergo an image alteration to correct the defect.

Techniques of the present invention further include using image acquisition data to determine the color spectrum of a potential defect. For example, the distance between the lens and flash impacts the color spectrum of red-eye defects. FIG. 6a shows a common color spectrum for red-eye defects for flash-to-lens distances of 2 cm, and FIG. 6b shows the resultant defects in captured images for flash-to-lens distances of 5 cm. By knowing the spectrum of colors to expect for a particular defect, algorithms can be refined. For example, in a red-eye removal algorithm configured to look for a spectrum of colors in a range of shapes, the spectrum of colors looked for can be narrowed based on the image acquisition data, thus reducing the number of false positives.

Using Image Acquisition Data to Determine Dynamic Anthropometric Data

Anthropometry is generally defined as the study of human body measurement for use in anthropological classification and comparison. Static anthropometric data, such as the ratio of eye width to eye separation or the ratio of eye size to head size, can provide good indication as to whether an object is an eye, based on analysis of other detected human objects in the image. Much anthropometric data, however, is dynamic and will change depending on the conditions under which an image is captured. For example, pupil size is not constant and changes as a function of light, and eye gaze changes based on how a subject rotates its eyes.

Techniques of the present invention include using image acquisition data to estimate or determine dynamic anthropometric data, such as pupil size. Pupil size can be reasonably estimated based on image acquisition data describing ambient light conditions at the time the image was captured. It is known that pupil size varies as a function of the amount of light in the field of view of the subject. FIG. 7 shows a plot illustrating an example of that variation. Relationship data between a detected value indicative of ambient light and an estimated pupil size can be stored on a digital image acquisition device so that if an amount of ambient light is known, an estimated on-subject pupil size can be determined.

The estimated size of the on-subject pupil can then be implemented into defect correction algorithms in a variety of manners. For example, flash-induced eye defects are due to light originating from a flash bouncing off the retina and reaching the lens. Thus, if the angle between the flash, retina, and lens is small enough, the light cannot reach the lens and no eye defects appear. This typically happens when the subject is very close to the camera or the subject's pupil is very constricted. Flash-induced defects seldom appear in broad daylight in part because the retina is highly constricted. Techniques of the present invention include using this fact in detecting and correcting flash-induced eye defects. Although the critical angle varies slightly with certain physiological characteristics such as eye color, normal upper limits for healthy adults can be estimated. For example, an upper limit for Caucasians might be approximately 3 degrees. For a given on-subject pupil size and flash to lens distance, there exists a minimum distance (also referred to as a critical distance) between the camera and the subject for which a defect in the eye might appear. Using basic geometrical calculus, die following formula can be used to calculate a critical distance.

CriticalDistance=(FlashLensDistance−OnSubjPupilSize)/[2 atan(critical angle/2)]

As discussed above, FlashLensDistance is the distance between the flash and lens which can be either stored by a device designer or calculated dynamically at the time of image capture. Using the estimated critical angle and estimated oil-subject pupil size, a critical distance can be calculated. Based, at least in part, on the critical distance and the distance between the lens and subject, a course of action can be determined. For example, if the value for the distance between the lens and the subject stored in the image acquisition data is less than a threshold value for the determined critical distance, then no defect correction algorithms need to be applied to the captured image. Not executing an unneeded defect correction algorithm saves a user time, reduces shot-to-shot time, and reduces power consumption. Not executing an unneeded defect correction algorithm further eliminates any chance of the algorithm identifying a false positive and altering a portion of an image that should not be altered.

Dynamic anthropometric data relating to on-subject pupil size can also be used with other image acquisition data, such as lens focal length, to determine an estimate of in-image pupil size. The estimated in-image pupil size can then be used in algorithms that set a maximum defect size. Many algorithms utilize maximum expected defect sizes to aid in determining if a candidate defect is an actual defect or a false positive. A candidate defect otherwise indicative of a flash-induced defect will not be altered if the candidate defect is greater in size than the maximum expected defect size on the assumption that the candidate defect is not actually depicting a human eye or portion of an eye such as a pupil. Most devices utilize absolute maximums so that all possible situations are covered, and defects are not missed. An estimated in-image pupil size determined by anthropometric data and image acquisition data as described in one embodiment of the present invention allows that absolute maximum to be decreased based on conditions when the image was captured, thus significantly reducing the number of false positives detected by a particular defect correction algorithm without reducing the number of true positives detected by the defect correction algorithm.

Using Image Acquisition Data in Conjunction with Eye Gaze Measurements

Techniques of the present invention further include using image acquisition data combined with other determined dynamic anthropometric data, such as eye-gaze measurements, to determine the likelihood that a certain type of defect will be present. Eye gaze can be measured, for example, by superimposing Active Appearance Models (AAMs) onto a detected face region. From the AAMs eye rotation and facial rotation can be measured to determine a total eye gaze. This eye-gaze information can provide advantageous information, particularly with respect to applying red-eye filters to an image, or reconciling differences between two paired red-eye candidates.

Different regions of the eye can cause different types of defects. For example, the retina which contains large amounts of blood vessels is likely to cause a red-eye defect, whereas other regions, not containing blood vessels, might be likely to cause a white or yellow-eye defect. By determining the gaze angle of an eye, the region of the eye that will reflect light back to a lens during image capture can be determined. Armed with that information, it can be determined whether a red-eye filter should or should not be applied, whether a filter in addition to a red-eye filter should be applied, etc.

FIG. 8a illustrates the normal case where the eye-gaze is directly into a lens and the flash enters the eye at a slight angle, stimulating the blood vessels of the retina, thus creating a condition that could cause a red-eye defect. FIG. 8b shows the axis of the eye aligned directly with the flash, with the subject's eye-gaze being slightly to the left (from the image acquisition device's perspective) but as the flash falls directly on the back of the retina, the flash still stimulates the retinal blood vessels potentially leading to a red-eye defect. In FIG. 8c the gaze angle extends a further few degrees to the left, and the flash is now directly incident on the blind spot region or the eye as opposed to the retinal region.

The blind spot tends to be off-axis by a number of degrees and causes a different type of defect than the retina. A more precise calculation of the relationship between the measured eye-gaze angle, the blind-spot offset, and the distance of the subject from the camera is given in FIG. 9.

The blind-spot offset is A2, which can be constant for a particular person, can be estimated based on average values. The eye-gaze angle is A1, and the distance to subject is D. The separation between flash and camera lens is S (not shown). Values for S and D can be obtained from stored image acquisition data.

$$\tan(A_1 - A_2) = \frac{S}{D}$$

and thus:

$$A_1 - A_2 = \tan^{-1}\left(\frac{S}{D}\right)$$

or the eye-gaze angle, A1, is related to S, D and A2 as:

$$A_1 = \tan^{-1}\left(\frac{S}{D}\right) + A_2$$

A table of example values for the $\tan^{-1}(S/D)$ term is given below, where the $\tan^{-1}(S/D)$ term represents the Angular contribution (in degrees) of the lens-to-flash distance to the eye-gaze angle.

| D | S = 0.025 cm | S = 0.25 | S = 0.075 | S = 0.15 |
|---|---|---|---|---|
| 1 meter | 1.43 | 2.86 | 4.29 | 8.53 |
| 2 meter | 0.72 | 1.43 | 2.15 | 4.29 |
| 3 meter | 0.48 | 0.95 | 1.43 | 2.86 |

By combining the image acquisition data with a measurement of eye gaze, it can be determined when to apply filters of a certain type. For example, if an eye gaze measurement and image acquisition data indicate that a flash is likely to impact in a region other than the retina because the total eye gaze is greater than a certain amount, then additional yellow-eye or golden-eye filters might be applied to compliment standard red-eye Filters. Eye gaze measurements may be performed on the main acquired image, or on a sequence of preview images (in order to predict or refine the eye gaze measurement on the main image).

Techniques of the present invention further include using eye gaze measurements to assist in the analysis of flash-eye pairs where one eye experiences a first defect and the second eye experiences a different defect. The reasons for this can be seen from FIG. 9 which shows that the eye gaze angles (A1 and A3) for an eye pair are somewhat different because of the distance separating the two eyes. A difference of more than 1-2 degrees in eye gaze angle can cause different forms of defects to occur in each eye of the eye-pair. By using an eye gaze measurement and image acquisition data to predict whether a pair of eyes should both experience a red-eye defect, neither experience a red-eye defect, or one experience a red-eye defect and the other experience something else, defect detection algorithms can be improved to eliminate false positives. For example, if an algorithm detects a candidate pair of eyes where both are indicative of a red-eye defect, but the eye gaze angle and image acquisition data indicate that neither eye or only one eye should experience a red-eye defect, then the candidate pair can be identified as a false positive without incorrectly altering the image. The eye gaze measurement can be used either instead of or in conjunction with other image processing techniques including other techniques mentioned in this disclosure.

Implementation Mechanisms

Hardware Overview

FIG. 10 is a block diagram that illustrates an image acquisition device 1000 upon which an embodiment of the invention may be implemented. The image acquisition device 1000 can include an image capture apparatus 1020 comprising a lens 1022 and a source of light for providing illumination during image capture 1024. The image capture apparatus 1020 can further comprise distance analyzer 1028 for determining a distance between a point on the device 1000 and a subject. The image capture apparatus 1020 can further comprise a light sensor 1026 that can be, for example a CCD, CMOS or any other object that transforms light information into electronic encoding. The image capture apparatus 1020 can further comprise a mechanism 1029 for monitoring parameters of the lens 1022 during image acquisition. Relevant parameters of the lens during acquisition can include the aperture or an f-stop, which primarily determines the depth of field, the focal length which determines the enlargement of the image, and the focusing distance which determines the distance to the objects at which the lens 1022 was focused.

The image acquisition device 1000 may be contained within a single device, such as a lens connected to a personal computer, a portable camera, a smartphone, a video camera with still image capturing capability, etc. Alternatively, various portions of the image acquisition device 1000 might be distributed between multiple devices, such as having some components on a personal computer and some components on a portable digital camera. Image acquisition device 1000 includes a bus 1002 or other communication mechanism for communicating information, and a processor 1004 coupled with bus 1002 for processing information. Image acquisition device 1000 also includes a main memory 1006, such as a random access memory ("RAM") or other dynamic storage device, coupled to bus 1002 for storing information and instructions to be executed by processor 1004. Main memory 1006 also may be used for storing temporary variables or other intermediate information during execution of instructions to be executed by processor 1004. Image acquisition device 1000 further includes a read only memory ("ROM") 1008 or other static storage device coupled to bus 1002 for storing static information and instructions for processor 1004. A storage device 1010, such as a magnetic disk or optical disk, is provided and coupled to bus 1002 for storing information and instructions.

Image acquisition device 1000 may be coupled via bus 1002 to a display 1012, such as a liquid crystal display (LCD), for displaying information or images to a user. An input device 1014, including keys, is coupled to bus 1002 for communicating information and command selections to processor 1004. Other types of user input devices, for example cursor controllers 1016 such as a mouse, trackball, stylus, or cursor direction keys for communicating direction information and command selections to processor 1004 can also be used for controlling cursor movement on display 1012 for communicating information and command selections to processor 1004.

The term "computer-readable medium" as used herein refers to any medium that participates in providing instructions to processor 1004 for execution. Such a medium may take many forms, including but not limited to non-volatile media and volatile media. Non-volatile media includes, for example, optical or magnetic disks, such as storage device 1010. Volatile media includes dynamic memory, such as main memory 1006.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read. Any single type or combination of computer-readable media can be used for storing instructions that, when executed by one or more processors, cause the processors to carry out steps corresponding to the techniques of the present invention.

Extensions and Alternatives

In this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. One or more non-transitory processor-readable media having embedded code therein for programming a processor to perform a method of detecting a potential defect in an image, the method comprising:
   storing a first value indicative of a position of a source of light relative to a lens;
   wherein the first value indicates whether the source of light is:
      to the right of the lens,
      to the left of the lens,
      to the bottom of the lens,
      to the top of the lens,
      to the top right of the lens,
      to the top left of the lens,
      to the bottom left of the lens, or
      to the bottom right of the lens;

determining a second value indicative of a distance between an image capture apparatus and a subject;
determining a third value indicative of a lens focal length;
determining an in-image pupil size based, at least in part, on the first value, the second value, and the third value;
using the first value to identify an expected orientation for a half-red eye defect; and
identifying defect candidates in the image at least in part based on the expected orientation and the in-image pupil size.

2. One or more non-transitory processor-readable media as in claim 1 further comprising logic for determining whether the first value is greater than a threshold value, wherein the course of action comprises not altering the digital image if the first value is greater than the threshold value.

3. One or more non-transitory processor-readable media claim 1 further comprising logic for determining whether the first value is less than a threshold value, wherein the course of action comprises analyzing the image to identify flash-eye defect candidates if the first value is less than the threshold value.

4. One or more non-transitory processor-readable media claim 1, further comprising logic for:
  determining an on-subject pupil size based, at least in part, on the first value;
  determining whether to perform a corrective action based, at least in part, on the on-subject pupil size.

5. One or more non-transitory processor-readable media claim 1, further comprising logic for:
  determining an on-subject pupil size based, at least in part, on the first value;
  determining a critical distance based, at least in part, on the on-subject pupil size and the second value;
  determining whether to perform corrective action on the image based, at least in part, on the critical distance.

6. One or more non-transitory processor-readable media claim 1, wherein the step of identifying defects includes searching the image only for defects that are the same size as, or smaller, than the in-image pupil size.

7. A portable digital image acquisition device comprising:
  a lens;
  a digital imaging capturing apparatus;
  a source of light for providing illumination during image capture;
  logic for performing the following operations:
    storing a first value indicative of a position of a source of light relative to a lens;
    wherein the first value indicates whether the source of light is:
      to the right of the lens,
      to the left of the lens,
      to the bottom of the lens,
      to the top of the lens,
      to the top right of the lens,
      to the top left of the lens,
      to the bottom left of the lens, or
      to the bottom right of the lens;
    determining a second value indicative of a distance between an image capture apparatus and a subject;
    determining a third value indicative of a lens focal length;
    determining an in-image pupil size based, at least in part, on the first value, the second value, and the third value;
    using the first value to identify an expected orientation for a half-red eye defect;
    identifying defect candidates in the image at least in part based on the expected orientation and the in-image pupil size.

8. The portable digital image acquisition device of claim 7 further comprising logic for determining whether the first value is greater than a threshold value, wherein the course of action comprises not altering the digital image if the first value is greater than the threshold value.

9. The portable digital image acquisition device of claim 7 further comprising logic for determining whether the first value is less than a threshold value, wherein the course of action comprises analyzing the image to identify flash-eye defect candidates if the first value is less than the threshold value.

10. The portable digital image acquisition device of claim 7 further comprising logic for:
  determining an on-subject pupil size based, at least in part, on the first value;
  determining whether to perform a corrective action based, at least in part, on the on-subject pupil size.

11. The portable digital image acquisition device of claim 7 further comprising logic for:
  determining an on-subject pupil size based, at least in part, on the first value;
  determining a critical distance based, at least in part, on the on-subject pupil size and the second value; and
  determining whether to perform corrective action on the image based, at least in part, on the critical distance.

12. The portable digital image acquisition device of claim 7, wherein the step of identifying defects includes searching the image only for defects that are the same size as, or smaller, than the in-image pupil size.

* * * * *